United States Patent
Moon et al.

(10) Patent No.: US 8,724,805 B2
(45) Date of Patent: May 13, 2014

(54) SECURITY LABEL GENERATION METHOD AND APPARATUS FOR SCALABLE CONTENT DISTRIBUTION

(75) Inventors: Yong-Hyuk Moon, Daejeon (KR); Dong il Seo, Daejeon (KR); Jae Hoon Nah, Daejeon (KR); Hyeokchan Kwon, Daejeon (KR); Seungmin Lee, Daejeon (KR); Taek Yong Nam, Daejeon (KR); Dae-Hee Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 219 days.

(21) Appl. No.: 13/329,769

(22) Filed: Dec. 19, 2011

(65) Prior Publication Data
US 2012/0163594 A1    Jun. 28, 2012

(30) Foreign Application Priority Data
Dec. 23, 2010    (KR) .................. 10-2010-0133775

(51) Int. Cl.
H04N 7/167    (2011.01)
(52) U.S. Cl.
USPC .................................... 380/200; 380/201
(58) Field of Classification Search
CPC ............ H04L 9/088; H04L 2209/60; H04N 21/34327; H04N 21/2347
See application file for complete search history.

(56) References Cited

U.S. PATENT DOCUMENTS

2005/0180563 A1*  8/2005  Apostolopoulos et al. ..... 380/28
2010/0241871 A1*  9/2010  Raley et al. .................. 713/189
2010/0263060 A1   10/2010  Charbonneau et al.

FOREIGN PATENT DOCUMENTS

KR    1020040075613 A    8/2004
KR    1020070099408 A    10/2007

OTHER PUBLICATIONS

Zhengming Shen et al., "Security and QoS Self-Optimization in Mobile Ad Hoc Networks", IEEE Transactions on Mobile Computing, Sep. 2008, p. 1138-1151, vol. 7 No. 9, IEEE.

* cited by examiner

*Primary Examiner* — Brandon Hoffman
*Assistant Examiner* — Nega Woldemariam

(57) ABSTRACT

A security label generation apparatus for scalable content distribution, includes a scalable content transmitter for receiving service level requirements of a user and network bandwidth information over a network and generating security labels and encrypted scalable units. Further, the security label generation apparatus includes a scalable content receiver for receiving the encrypted scalable units and the security labels from the scalable content transmitter and for decrypting, decoding, playing, modifying, storing or redistributing the encrypted scalable units based on the security labels. Furthermore, the security label generation apparatus includes scalable content storage for searching for scalable content and metadata corresponding to a request of the scalable content transmitter.

18 Claims, 12 Drawing Sheets

IMPORTANCE EXAMPLE(3300)

HIGH-PERFORMANCE
WEIGHT → HIGH-SECURITY
WEIGHT

LLV                 HHV

SECURITY LABEL GENERATION METHOD AND APPARATUS FOR SCALABLE CONTENT DISTRIBUTION

CROSS-REFERENCE TO RELATED APPLICATION(S)

The present invention claims priority of Korean Patent Application No. 10-2010-0133775, filed on Dec. 23, 2010, which is incorporated herein by reference.

FIELD OF THE INVENTION

The present invention relates generally to a technology for more efficiently and differentially servicing multimedia video data, for example, scalable content data that is encoded using Scalable Video Coding (hereinafter referred to as 'SVC')-based video compression standards, in terms of security and performance; and, more particularly, to a security label generation method and apparatus for scalable content distribution, which are suitable for guaranteeing the most appropriate security and performance Quality of Service (QoS) upon distributing individual scalable units, by determining an optimal security policy that can satisfy the best security and performance QoS for a user's budget, using six kinds of evaluation indices and by configuring the optimal security policy in the form of explicit security labels.

BACKGROUND OF THE INVENTION

Conventional multimedia service technology has been focused on proposing techniques for minimizing the delay attributable to data transmission and for pursuing excellence in terms of performance. Further, the conventional multimedia service technology depends on techniques that provide encapsulation and integrity by encrypting all data to provide data security. However, video data has the advantage of, because only a part of data fundamentally required to reconstruct video is selectively encrypted unlike typical non-multimedia data (for example, text data), being able to provide the same security as is obtained when all of the data is encrypted. That is, such selective encryption allow problems to be avoided, namely the problem of the occurrence of an additional overhead due to having to encrypt all the data and there being a delay in playing attributable to the decryption of video upon decoding the video.

However, there are problems in that the exact evaluation of the performance overhead based on selective encryption is insufficient at present, and contents related to the configuration of security are not treated as principal elements of performance.

In addition, the security provided by a conventional multimedia distribution service is provided to the extent of checking only the rights to use the content using a simple access control technique and of determining whether to provide the content. For example, there is a serious disadvantage in that since content has been distributed with the same security applied to a single piece of content, the distribution of content can be conducted without permission by illegally accessing the content once the security vulnerabilities of the relevant content has become known by the world at large.

However, as Scalable Video Coding (SVC), which is a video compression standard that is an extended version of International Telecommunications Union—Telecommunication Standardization Sector (ITU-T) H.264/Advanced Video Coding (AVC) standard, has recently appeared, multi-layered coding transport technology has been actualized. Accordingly, the structure of content can be variably reorganized in conformity with service requirements by performing encoding a single time. For example, depending on requirements such as the performance of a specific reception terminal, the bandwidth situation of a transmission network, or the degree of subscription to a video streaming service, video data of a quality suitable to those requirements can be dynamically configured and provided in terms of three kinds of scalability (resolution, Frames per Second (FPS), Signal-to-Noise ratio (SNR)).

Content that can be distributed in various units depending on the service situation using video compression technology such as the SVC standard is designated as scalable content, and a basic unit constituting each piece of scalable content is designated as a scalable unit.

Accordingly, there has been a heightened need to provide differentiated security in terms of performance by providing content on a scalable unit basis rather than providing content on a piece-of-content basis any longer. The provision of individual security denotes a scheme in which different security techniques need to be operated for respective scalable units. Therefore, there is the probability of an increase in complexity due to the distribution of scalable content that has been encoded using an SVC standard. Therefore, when any security technique is given, accurately evaluating the influence of the security technique exerted in terms of performance and security of the entire service is an urgent requirement.

In addition, existing research into the protection of scalable content has generally revealed a tendency to regard a visual distortion index such as visual degradation as important on the basis of the results of experiments conducted on individual videos. However, in order to provide adaptive optimal security for content, relationships between various indices, such as encryption speed, protection strength, device capacity, required streaming video quality, visual distortion, network cost and redistribution cost, need to be considered together within the scope of a security policy.

SUMMARY OF THE INVENTION

In view of the above, the present invention provides a security label generation technology for the distribution of security and performance QoS guaranteeing-type scalable content, which provides a service by applying differentiated security policies that are evaluated using performance indices to the service in consideration of requirements and service conditions different for respective scalable units, thus adaptively guaranteeing security and performance QoS in the distribution of scalable content.

Further, the present invention provides a security label generation technology for the distribution of security and performance QoS guaranteeing-type scalable content, which configures template security policies for different encryption parts, different volumes of the encryption parts, different encryption key lengths, and different encryption algorithms by taking into consideration users' service level requirements, network bandwidth, and information importance that are different for individual scalable units, from different angles, determines an optimal service policy by evaluating the configured security policies on the basis of three kinds of security evaluation indices and three kinds of performance evaluation indices, and provides the optimal service policy in the form of security labels. Accordingly, security levels differentiated for respective scalable units are distributed in the form of self-protected scalable units, thus effectively providing adaptive fairness and a sense of balance in terms of security and performance.

In accordance with a first aspect of the present invention, there is provided a security label generation apparatus for scalable content distribution, including: a scalable content transmitter for receiving service level requirements of a user and network bandwidth information over a network and generating security labels and encrypted scalable units; a scalable content receiver for receiving the encrypted scalable units and the security labels from the scalable content transmitter and for decrypting, decoding, playing, modifying, storing or redistributing the encrypted scalable units based on the security labels; and scalable content storage for searching for scalable content and metadata corresponding to a request of the scalable content transmitter.

In accordance with a second aspect of the present invention, there is provided a security label generation method for scalable content distribution. The security label generation method includes, when a request for scalable content together with service level requirements, are received from a scalable content receiver, a scalable content distributor unbinding the service level requirements and scalable content from a network protocol, and classifying and identifying the service level requirements and the scalable content for respective items. Further, the security label generation method includes the scalable content distributor requesting scalable content storage to search for the scalable content and metadata, and receiving the scalable content and the metadata; and the scalable content storage transmitting the metadata to an information classifier and evaluating and classifying information importance.

Further, the security label generation method includes analyzing the user level requirements received from the scalable content distributor, and related security and performance requirements for network bandwidth information received from a network weather monitor; and differently configuring encryption parts, a volume of the encryption parts, encryption algorithms, encryption key lengths, and related security items, for respective scalable units based on the analyzed performance requirements, and then generating a plurality of template security policies.

Further, the security label generation method includes evaluating the generated template security policies in terms of six kinds of security-performance indices, calculating security-performance levels and costs, and then determining a security policy; and configuring the determined security policy together with the scalable content in a form of security labels, transferring the configured security labels to the scalable content distributor, commanding an encoder and extractor to perform encoding, and applying encryption to the scalable content using a specific method for each relevant scalable unit. Furthermore, the security label generation method includes combining encrypted scalable content with the security labels, binding combined results into a protocol of a network, and transmitting a resulting network protocol to the scalable content receiver over the network.

As described above, in accordance with the present invention, the optimal security policy determined using six kinds of security-performance evaluation indices may be configured in the form of explicit security labels so as to provide a scalable content distribution service that is more reliable and is excellent in performance. In detail, the present invention is characterized in that user budget is established on a scalable unit basis, and the cost required to perform each security policy is calculated and compared to the budget, so that even if a security label enabling excellent security and performance to be provided is given, whether such a security label can be realistically provided in terms of cost can be determined. Further, security policies (or security labels) can be uniformly evaluated using three security level evaluation indices and three performance level evaluation indices, so that there is an advantage in that the adaptive QoS that has variety and that more satisfactorily fulfills service requirements, for example, performance-priority policy, security-priority policy or security-performance harmonic policy, can be provided. Furthermore, each security label provides security-related information such as encryption parts, the volume of the encryption parts, encryption key lengths, encryption algorithms, and hash functions of scalable units, so that differentiated security and performance configuration can be guaranteed for individual scalable units. Therefore, the security label configuration technique in accordance with the present invention measures the excellence of security policies using six kinds of core security-performance evaluation indices, which are configured in terms of encryption parts, the volume of the encryption parts, encryption key lengths and encryption algorithms, in consideration of information importance of individual scalable units constituting scalable content as well as various users' requirements and network situations. Further, such a technique regards a difference between the user budget and cost required to perform policy as a principal condition.

Accordingly, the present invention is advantageous in that it enables the provision of an active technique and apparatus capable of providing an adaptive QoS, which is closer to the requirements of user service levels, is economic in cost, and minimizes security and performance vulnerability, in the form of each security label on a scalable unit basis.

DETAILED DESCRIPTION OF THE EMBODIMENTS

Figure 1:
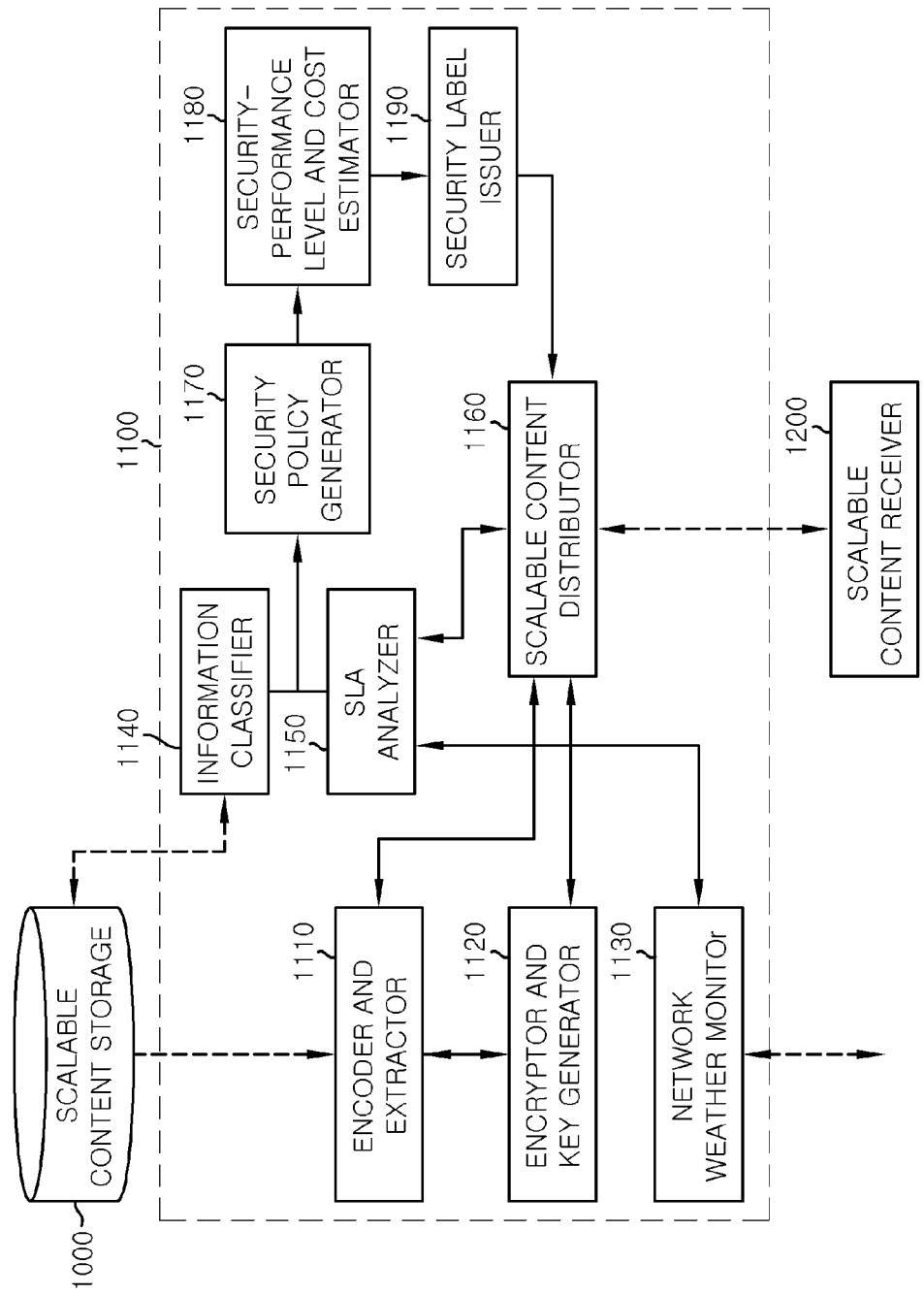
FIG. 1 is a block diagram showing a security label generation apparatus for scalable content distribution in accordance with an embodiment of the present invention.

Embodiments of the present invention will be described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram.

Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

The present invention primarily acquires service level requirements from a user terminal, takes network bandwidth into consideration, and analyzes the service level requirements in terms of the information importance of relevant scalable units to configure security policies in which both security and performance indices are taken into consideration when transmitting individual scalable units, thus configuring template security policies that can entirely satisfy the three items in terms of encryption parts, the volume of the encryption parts, encryption key lengths and encryption algorithms. The configured template security policies are evaluated using six kinds of security-performance level evaluation indices, so that it can be determined which policy can guarantee optimal security and performance QoS within a range in which an available budget required for a user to receive a relevant scalable unit does not exceed cost required to distribute the relevant scalable unit in conformity with the security policy. The optimal security configuration acquired in this way can be provided together with the scalable unit to the user in the form of security labels. The user can handle (for example, decrypt, decode, play, modify, store, redistribute and the like) each scalable unit depending on a relevant security label.

Hereinafter, embodiments of the present invention will be described in detail with reference to the accompanying drawings.

FIG. 1 is a block diagram showing the construction of a system based on the generation and distribution of the security labels of scalable content in accordance with an embodiment of the present invention in terms of function blocks.

The unidirectional arrows in FIG. 1 indicate that a request is made or specific data is transferred from one function block to another function block, and the bidirectional arrows indicate that a request and a return are made between function blocks. A dotted line arrow may indicate that communication between a function block and an external entity is performed over an Internet Protocol (IP)-based wired or wireless network.

As shown in FIG. 1, scalable content storage 1000 may refer to media storage or a database (DB) for storing raw video data of scalable content.

A scalable content transmitter 1100 may include all function blocks for performing functions of encoding and encrypting scalable content, generating a related security policy, evaluating security, generating security labels, and transmitting streaming data. The scalable content transmitter 1100 may include an encoder and extractor 1110, an encryptor and key generator 1120, a network weather monitor 1130, an information classifier 1140, a Service Level Agreement (SLA) analyzer 1150, a scalable content distributor 1160, a security policy generator 1170, a security-performance level and cost estimator 1180, and a security label issuer 1190.

The encoder and extractor 1110 may function to encode scalable content and extract layers of the encoded scalable content depending on a user terminal, a network situation, and service requirements.

The encryptor and key generator 1120 may function to encrypt part or all of the scalable content and generate a related encryption key having a specific length.

The network weather monitor 1130 may function to measure network bandwidth between the scalable content transmitter 1100 and a scalable content receiver 1200, which will be described later.

The information classifier 1140 may function to evaluate the information importance of individual scalable units constituting the scalable content.

The SLA analyzer 1150 may function to analyze the degree of service level agreement in light of both the user level requirements and the network bandwidth.

The scalable content distributor 1160 may function to combine the scalable content that has been encoded and encrypted, with the security labels, bind the combined results into a network protocol, for example, a Transmission Control Protocol/Internet Protocol (TCP/IP)-based network protocol, and then distribute a resulting network protocol to a recipient.

The security policy generator 1170 may function to generate template security policies to be applied to relevant scalable content from four angles to be applied to the scalable content, for example, encryption parts, the volumes of the encryption parts, the lengths of encryption keys, and encryption algorithms.

The security-performance level and cost estimator 1180 may function to evaluate the template security policies generated by the security policy generator 1170 on the basis of six kinds of security-performance level indices, which will be described later with reference to FIGS. 2A and 2D, and then evaluate a security-performance level and the cost.

The security label issuer 1190 may function to modify and configure a security policy, required to provide the optimal security-performance QoS acquired by the security-performance level and cost estimator 1180 at a cost within the budget, to an item such as a security label 2400, which will be described later with reference to FIGS. 2A and 2D, and then to issue the security policy as an explicit security label.

The scalable content receiver 1200 may function to unbind the encrypted scalable content and the security labels from the TCP/IP-based network protocol, and treat the scalable content depending on the security labels.

FIGS. 2A to 2D are diagrams showing examples of service level requirements, network weather monitoring items, security policy items, security-performance level evaluation items, and security label items in accordance with an embodiment of the present invention.

Figure 2A:
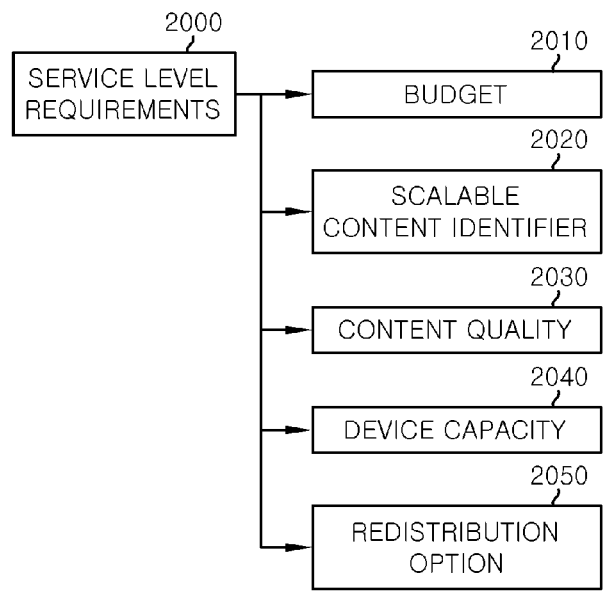
FIGS. 2A to 2D are diagrams illustrating service level requirements, network monitoring items, security policy items, security-performance level evaluation items, and security label items in accordance with the embodiment of the present invention.

Service level requirements 2000 of FIG. 2A define the service requirements of a user and a user terminal as six items, which may include, for example, budget 2010, a scalable content identifier 2020, content quality 2030, device capacity 2040, a redistribution option 2050, etc., which are required to receive and process (e.g., process the decryption, decoding, playing, modification, redistribution, etc.) relevant scalable content.

Figure 2B:
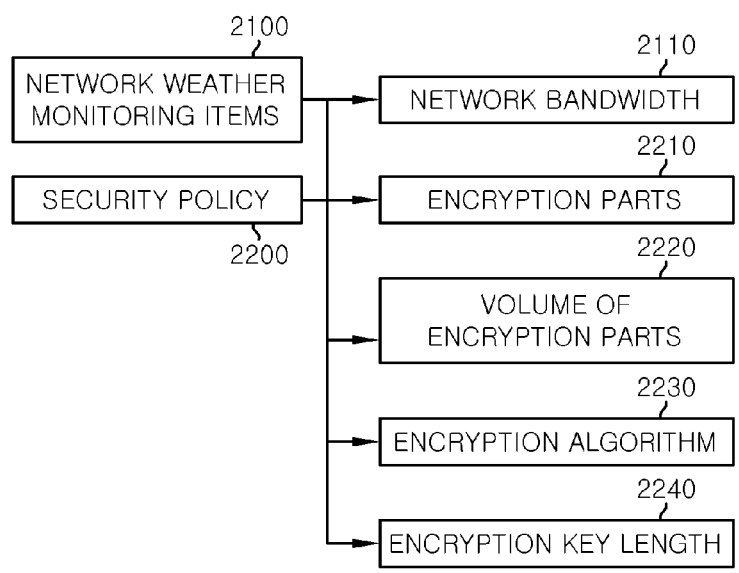

The network weather monitoring items 2100 of FIG. 2B may include network bandwidth 2110, and may additionally take into consideration indices such as jitter, delay, and routing utilization when more detailed requirements related to a network situation occur.

The security policy 2200 of FIG. 2B may be randomly generated based on encryption parts 2210, the volume of encrypted parts 2220, an encryption algorithm 2230, encryption key length 2240, etc. In addition, an item such as the encryption mode can be added so as to predefine the execution mode of a specific encryption algorithm. Further, when a security policy is generated as arbitrary values for four items, the cost required to generate the relevant security policy may be calculated.

Figure 2C:
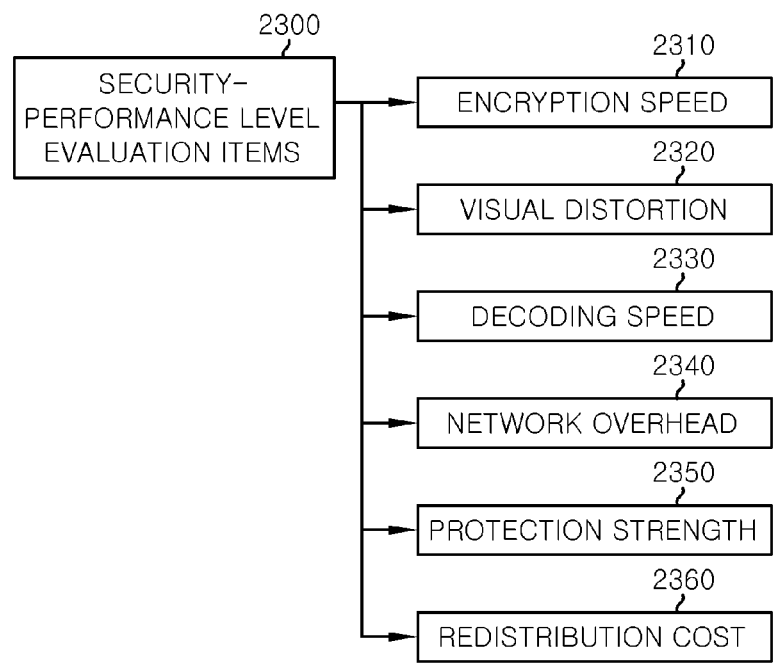

The security-performance level evaluation items 2300 of FIG. 2C may be classified into visual distortion 2320, protection strength 2350, and redistribution cost 2360 which are security indices, and encryption speed 2310, decoding speed 2330, and network overhead 2340 which are performance indices.

The encryption speed 2310 may be determined by the complexity required to determine the location of encryption parts, the time required to apply an actual encryption algorithm, a specific area to be encrypted, the amount of data to be encrypted, the encryption key length, algorithm speed, encryption mode, etc.

The protection strength 2350 may be indirectly determined between the complexities of an encryption key guessing attack and the bit stream prediction attack of scalable content based on statistics.

The device capacity 2040 is an important factor determining video decryption speed or decoding speed. Therefore, as devices support more excellent performance (for example, screen size, network capacity, buffering, and a processor), they can receive and process higher-quality video data.

The visual distortion 2320 may be generally evaluated as a visual distortion index that depends on the Mean Square Error (MSE) or Peak Signal-to-Noise Ratio (PSNR) and the subjective cognition of an evaluator.

The network overhead 2340 is proportional to the size of data to be transmitted given the assumption of the same bandwidth. Therefore, a variation in the compression ratio of video data caused by the encryption acts as a direct factor increasing relevant cost.

The redistribution cost 2360 may be calculated in consideration of both the cost required to convert the structure of scalable content by the encoder and extractor 1110 and damage costs attributable to the risk of security to be endured upon retransmission. Therefore, this element may be understood to be an important index for end-to-end content protection.

Figure 2D:
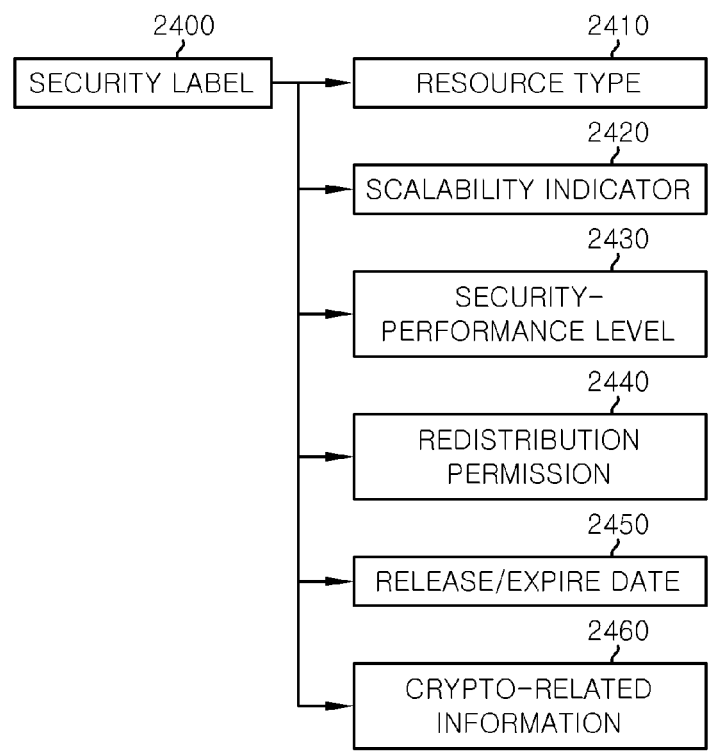

The security label 2400 of FIG. 2D may include a resource type 2410 to indicate the type of scalable content, a scalability indicator 2420 to indicate the scalability configuration information of content, a security-performance level 2430 to indicate a security-performance level, redistribution permission 2440 to indicate whether to permit redistribution, release/expire date 2450 to indicate dates at which relevant scalable content is released and expired, and crypto-related information 2460 including pieces of information such as encryption parts, the volumes of the encryption parts, encryption key lengths, encryption algorithms, and hash functions.

The resource type 2410 may be classified into scalable content, non-scalable content, images, text, etc.

The scalability indicator 2420 may function as an indicator that indicates which components are included in scalable content in terms of spatial, temporal and quality.

The security-performance level 2430 may be determined by the profit ratio and the QoS. Here, the profit ratio denotes the ratio of cost to budget 2010 as given by the following Equation 1, and the QoS may be calculated as the region of each radial graph formed according to the execution of security policy protection technology, which will be described later with reference to FIGS. 4A to 4C.

$$A\ Profit\ Ratio = \frac{Budget - Cost}{Budget} \times 100(\%) \quad (1)$$

The redistribution permission 2440 is an item indicating whether the generated optimal security label can permit redistribution when a user requests the redistribution of scalable media. Whether to permit redistribution may be determined based on whether or not redistribution cost exceeds a specific threshold in each radial graph, which will be described later with reference to FIGS. 4A to 4C.

Figures 3A, 3B:
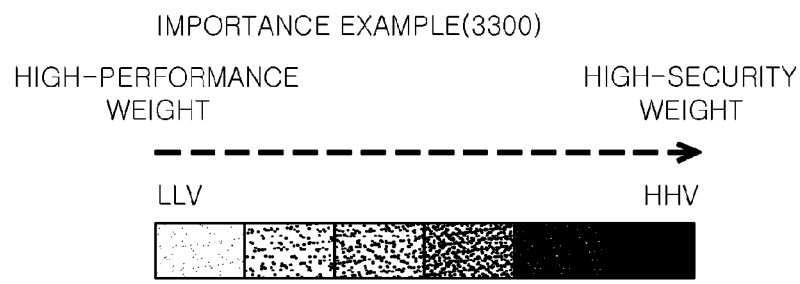
FIGS. 3A and 3B are diagrams showing the exemplary classification of information importance of scalable units in terms of visual reconstruction and semantic importance in accordance with the embodiment of the present invention.

FIGS. 3A and 3B illustrate a table presenting criteria required to classify the information importance of scalable units in terms of visual reconstruction and semantic importance.

Here, an information classification method presented in the table is used to set the degrees of weight regions, which the six kinds of security-performance evaluation indices stated in the security-performance level evaluation items 2300 of FIG. 2C will have in the radial graphs, which will be described later with reference to FIGS. 4A to 4C. A detailed procedure of the setting of weight regions will be described in detail later with reference to FIGS. 4A to 4C.

An information importance classification table 3000 shows an embodiment in which the information importance of individual scalable units, for example, layers, is classified in terms of visual reconstruction and semantic importance. First, in terms of visual reconstruction, a basement layer has the highest importance, and the relative importance decreases in the direction of enhancement layers containing additional information. Meanwhile, semantic importance may be regarded as information importance from business and security angles. When a relevant layer further contains a strategic meaning, it is classified as having the highest importance, whereas when a relevant layer further exhibits a personal meaning, it is classified as having the lowest importance. Here, L, H, M, and V denote low, high, medium, and valuable, respectively, and such information importance may be classified as in the case of LLV<MLV<HLV<LMV<MMV<HMV<LHV<MHV<HHV depending on combinations of individual letters. In detail, the first letter of such a combination-type index denotes importance in a performance index, and the second letter thereof denotes importance in a security index.

Reference numeral 3100 denotes information importance of visual reconstruction, in which the index of each column denotes importance in terms of visual reconstruction. In an embodiment of the present invention, scalable content is assumed to include a single basement layer and five enhancement layers.

Reference numeral 3200 denotes information importance for business and security, in which the index of each row denotes the importance of the meaning of the information which is to be transferred. 'Personal' denotes importance of personal meaning, 'Operative' denotes importance of a process, 'Tactical' denotes importance of tactics, and 'Strategic' denotes importance of strategy.

An importance example 3300 shows that as the classification of a scalable unit becomes closer to LLC (indicated in bright gray), comparatively higher weights are assigned to the three kinds of performance evaluation indices (e.g., encryption speed, decoding speed, and bandwidth overhead) among the six kinds of security-performance evaluation indices 2300 described above in FIG. 2C, and also shows that as the classification of a scalable unit becomes closer to HHV (indicated in dark black), comparatively higher weights are assigned to the three kinds of security evaluation indices (e.g., visual distortion, protection strength, and redistribution cost).

Figure 4A:
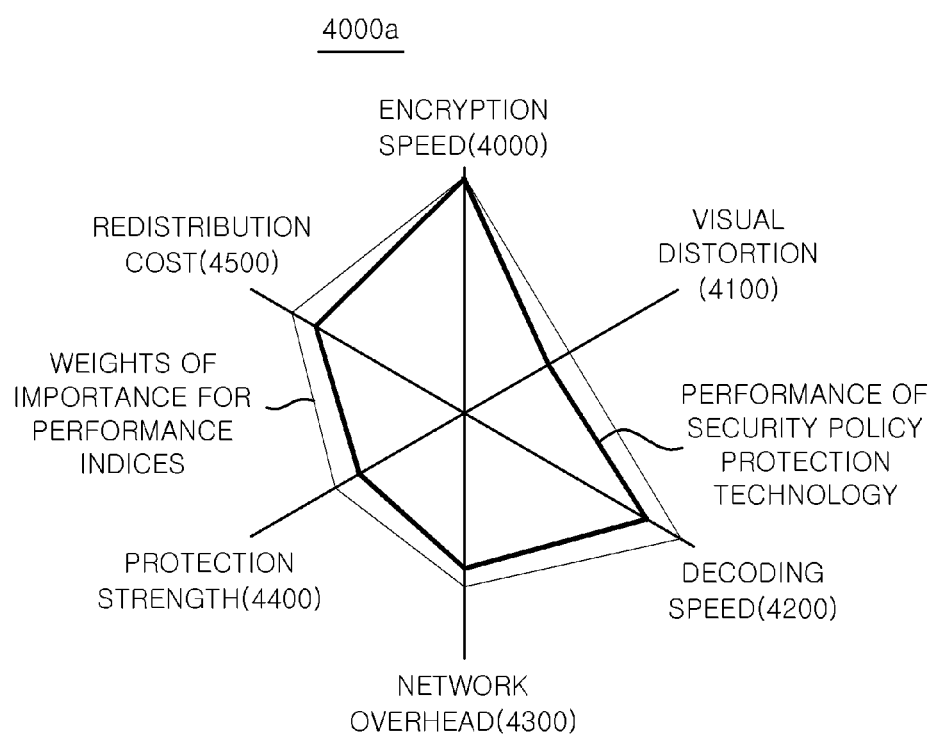
FIGS. 4A to 4C are diagram showing radial graphs depicted to evaluate the QoS of security policies in terms of six kinds of security-performance indices in accordance with the embodiment of the present invention.
Figure 4B:
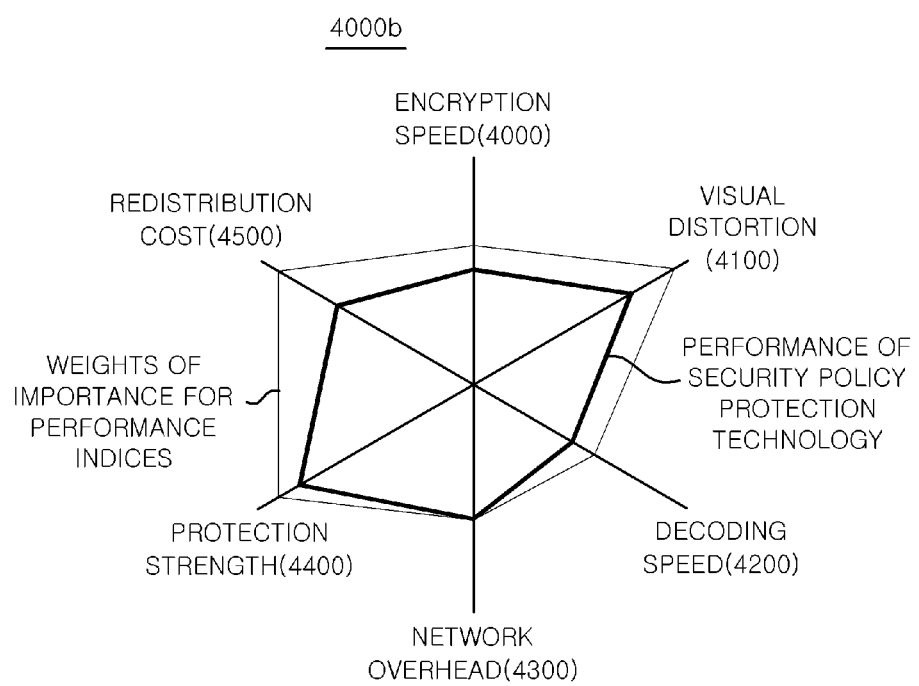
Figure 4C:
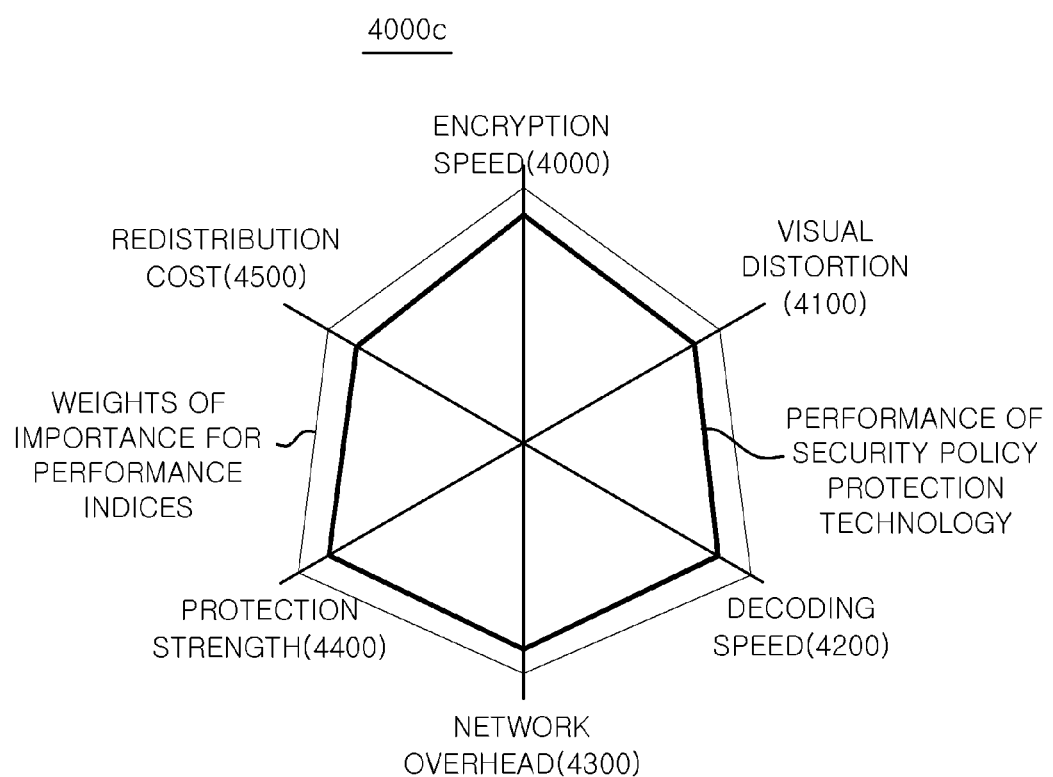

FIGS. 4A to 4C illustrates graphs showing an embodiment in which the QoS of template security policies is evaluated using radial graphs formed in terms of three kinds of security indices and three performance indices.

In FIGS. 4A to 4C, QoS denotes an index indicating the degree of satisfaction of security-performance levels, and enables a degree, in which a relevant security policy fulfils a requirement relative to a weight in each radial graph, to be quantified as the area of the radial graph. In addition, QoS functions as a principal factor determining the security-performance level 2430 which is one item of the security label 2400 described in FIG. 2D.

The embodiment of FIGS. 4A to 4C illustrates QoS evaluation, which shows three cases of performance priority policy 4000*a*, security priority policy 4000*b*, and security-performance harmonic policy 4000*c*. The security policy enables radial graphs to be formed based on six items, such as encryption speed 4000, visual distortion 4100, decoding speed 4200, network overhead 4300, protection strength 4400, and redistribution cost 4500 which are described above in the security-performance level evaluation items 2300 of FIG. 2C.

In this case, weights for respective evaluation items are assigned with reference to the information importance classification table, as described above in FIGS. 3A and 3B, so that graph regions such as the slashed regions of FIGS. 4A to 4C (importance weights for respective performance indices or weight factor boundaries) can be set. Thereafter, individual security policies that are randomly generated are evaluated in terms of six evaluation items, so that degrees, in which the randomly generated security policies satisfy those six evaluation items relative to the importance of actual pieces of information, can be indicated by the regions of the radial graphs. Therefore, the areas of the radial graph regions may be just QoS values.

The case where the value of a specific evaluation item deviates from a blue region is regarded as a case where the user budget that was invested in the specific evaluation item was exceeded, that is, a case where cost in excess of the budget have occurred. Therefore, such a security policy evaluated in this way is determined to be an undesirable security policy.

Further, even if higher weights are assigned to different evaluation items, there is the probability of an error occurring in such a way that the sizes of radial graph regions are identical to each other, and then QoS values of two different policies are evaluated as being identical to each other. However, in the embodiment of the present invention, when the security-performance level 2430 of the security label 2400 described in FIG. 2D is calculated, the required cost relative to the user budget is calculated as a profit ratio in addition to the QoS, and is additionally taken into consideration, and thus the probability of the occurrence of the above error can be eliminated. That is, even if QoS values are identical, two security policies may be understood on the system as being different security policies in terms of cost. In contrast, when QoS values are different even if the required costs are identical, relevant security policies may also be evaluated as different security policies.

In an embodiment of the present invention, even if two security policies having different weight factor boundaries have an identical QoS area, it does not mean that costs required to perform the relevant policies are identical. Preferably, a service manager must understand that services ultimately pursued by the security polices and desired to be provided to users are completely different from each other.

Figure 5A:
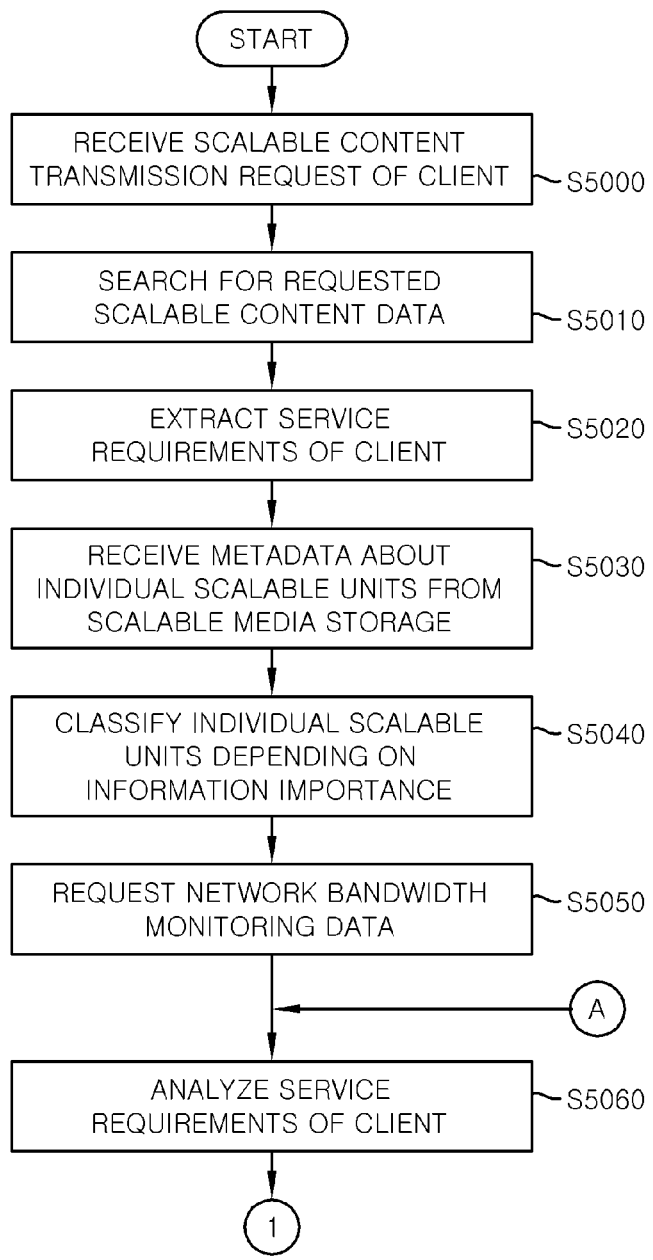
FIGS. 5A to 5C are flow charts showing a security label generation method in accordance with the embodiment of the present invention, which shows a process for generating an optimal security label for each individual scalable unit and distributing the optimal security label together with scalable content.
Figure 5B:
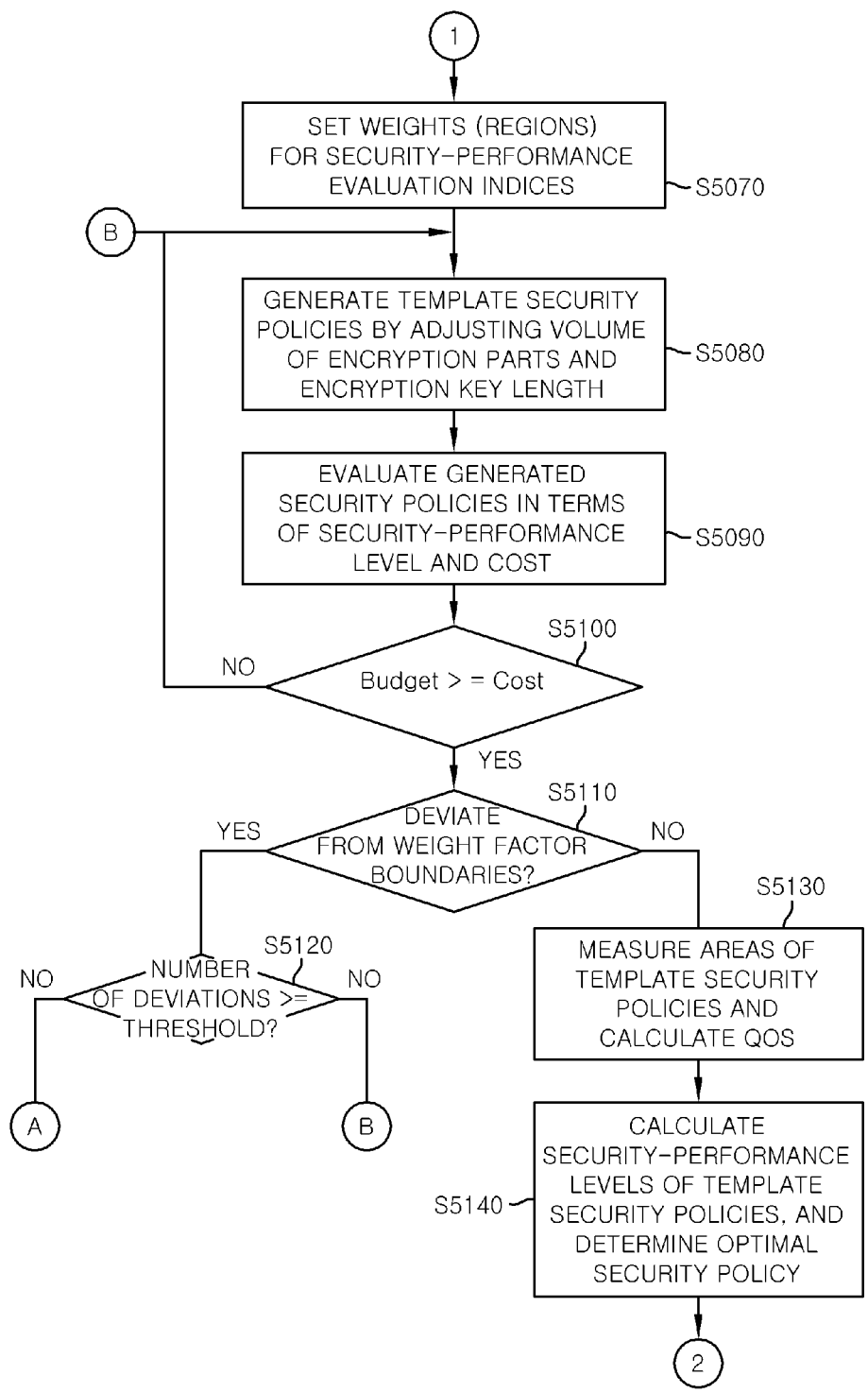
Figure 5C:
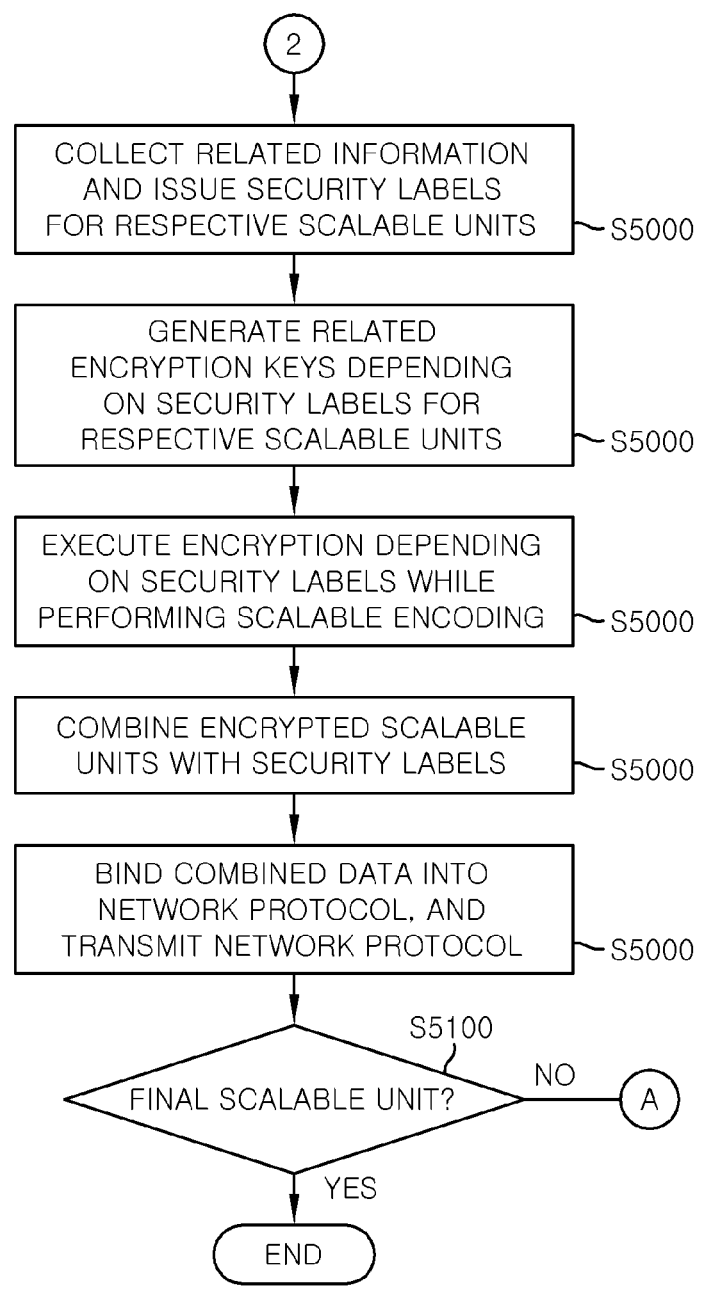

FIGS. 5A to 5C is a flow chart showing a process for making a scalable content distribution request, configuring security labels, combining the security labels with encrypted scalable units and then transmitting the combined results.

In this case, FIGS. 5A to 5C illustrates an example of a process for generating a security label for a single scalable unit, but this example may be extended to the case where security labels for all scalable units constituting scalable content are simultaneously generated.

In step S5000, when the scalable content receiver 1200 of FIG. 1 transfers a scalable content transmission request, the scalable content distributor 1160 receives the scalable content transmission request.

In step S5010, the scalable content distributor 1160 may extract a scalable content identifier 2020 from the service level requirements 2000 of FIG. 2A, and may request data searching from the scalable content storage 1000 via the encoder and extractor 1110 using the scalable content identifier 2020.

In step S5020, the scalable content distributor 1160 may additionally extract other items from the service level requirements 2000 of FIG. 2A.

In step S5030, the encoder and extractor 1110 may receive scalable content requested to be searched for and related metadata from the scalable content storage 1000.

In step S5040, the scalable content storage 1000 transmits the metadata to the information classifier 1140, and may enable the individual scalable units to be evaluated and classified depending on information importance with reference to the information importance classification table 3000 of FIG. 3A.

In step S5050, the SLA analyzer 1150 may request the network weather monitor 1130 to measure the bandwidth of a network either at any time or when a request is received from the scalable content distributor 1160.

In step S5060, the SLA analyzer 1160 may analyze the requirements of the scalable content receiver 1200 on the basis of the service level requirements extracted in steps S5010 and S5020 and the network information acquired in step S5050.

In step S5070, with reference to the information importance indices of the individual scalable units that have been evaluated and classified in step S5040, weights for the above-described six kinds of security-performance evaluation indices (weight factor boundary) can be set. It is assumed that the weights for the individual evaluation indices in accordance with an embodiment of the present invention are set to be normalized within a range of [0, 1] for each item.

In step S5080, the security policy generator 1170 may generate a plurality of template security policies by differently adjusting the encryption parts of the scalable content, the volumes of the encryption parts, the encryption key lengths, and encryption algorithms.

In step S5090, the template security policies generated in step S5080 are evaluated by the security-performance level and cost estimator 1180, and may be depicted inside weight boundary graphs in the form of the radial graphs of FIGS. 4A to 4C.

In step S5100, it is examined whether the cost required to perform each individual template security policy configured for each scalable unit is equal to or less than the budget of the user. If the cost is not equal to or less than the budget (in the case of No), the relevant template security policy is deleted, and the process returns to step S5080 where the operation of generating a new template security policy and evaluating it in terms of security-performance level and cost is performed once again. By this procedure, the user can select the security policy that is the most suitable and that is within the range of preset budget.

In step S5110, if the given budget can accommodate the cost (in the case of Yes), it is determined whether even one of the security policies deviates from the weight factor boundaries of the six kinds of security-performance evaluation items.

In step S5120, if it is determined that even one of the security policies deviates from the weight factor boundaries (in the case of Yes), the relevant security policy is excluded from evaluation targets, and the number of times the relevant security policy has previously deviated from the weight factor boundaries to date for the same scalable unit is calculated. If it is determined that deviation has occurred a predetermined number of times (a threshold level) or more, the procedure starting from step S5060 is performed again, otherwise the procedure starting from step S5080 is performed again. At the present step, the reason for calculating the number of deviations from the boundary for the same scalable unit and comparing the number of deviations with the relevant threshold is to acquire a predetermined number or more of template security policies that satisfy all of budget and boundary conditions and that can be compared, and to select a security policy guaranteeing the optimal QoS.

In step S5130, if it is determined in step S5110 that deviation from the boundaries does not occur (in the case of N), the areas of the respective template security policies may be measured and the individual QoS values may be calculated.

In step S5140, the respective profit ratios of the template security policies are calculated using the budget and cost acquired by the above procedures, and the individual security-performance levels are calculated using the QoS values. By means of the QoS values, a template security policy having the highest security-performance level can be determined to be an optimal security policy.

In step S5150, the security label issuer 1190 can configure the security label 2400 of FIG. 2D for individual items using the relevant information acquired at the above step, issue the security labels, and transfer the security labels to the scalable content distributor 1160.

In step S5160, the scalable content distributor 1160 requests the encryptor and key generator 1120 to generate relevant encryption keys depending on the security labels by transferring the security labels to the encryptor and key generator 1120.

In step S5170, the scalable content distributor 1160 requests the encryptor and key generator 1120 to execute an encryption task at the same time that the encoder and extractor 1110 performs encoding depending on the security labels by transferring the security labels to the encoder and extractor 1110. At the present step, encryption is assumed to be applied in stream chipper mode so as to improve the efficiency of the execution of encryption. The encryption of scalable units may be executed using different encryption parts, the different volumes of the encryption parts, different encryption key lengths, and different encryption algorithms which are described in the above-described security labels. In addition, the execution of encryption is presumed to be able to occur before, during or after the performance of encoding. However, in the case of a real-time streaming service, it is typically preferable to simultaneously perform encoding and execute an encryption task to support the security of a real-time encoding service so that encryption overhead can be reduced. Further, such an encryption task must be prevented from influencing the dynamic reconstruction (extraction) of scalable units.

In step S5180, the scalable content distributor 1160 may receive the encrypted scalable units from the encoder and extractor 1110 and combine the encrypted scalable units with the generated security labels.

In step S5190, after the resulting data combined in step S5180 is bound into a TCP/IP-based network protocol, the resulting network protocol may be transferred to the scalable content receiver 1200 over a wired or wireless IP network, such as the Internet.

In step S5200, the scalable content receiver 1200 determines whether a scalable unit currently being received is the last (end) scalable unit constituting scalable content requested to be transferred. If the current scalable unit is the last scalable unit (in the case of Yes), the process is terminated, otherwise (in the case of No), the procedure starting from step S5060 may be repeated.

Additional Descriptions and Assumptions

Each scalable unit may be considered to be a unit such as a macroblock, slice, frame, group of pictures, network abstraction layer, or layer, and it is assumed that the selection of a relevant unit level is determined by a scalable content distributor or a system manager.

Further, each scalable unit may be designated as any of various video units such as a macroblock, slice, frame, group of pictures, network abstraction layer, or layer, thus enabling the overhead caused by the configuration of each security label to be adaptively adjusted.

When scalable content is transmitted, all the security labels based on individual scalable units may be configured before the scalable content is transmitted. Depending on the circumstance, the security labels may be generated in real time when the individual scalable units are transmitted, and may then be transmitted together with the individual scalable units to the user.

However, in this case, it is assumed that parts that can be encrypted do not violate format-compliance rules by excluding core control data required to reconstruct video, for example, header (macroblock header, slice header, layer header, or the like) information. For example, intra-prediction mode values, residual coefficients (AC, DC) values or sign bits, parameters of exponential Golomb, parameters of context-adaptive variable length coding, parameters of context-adaptive binary arithmetic coding, sequence parameter sets, picture parameter sets, instantaneous decoding references, intra-frames, etc. may be regarded as the parts that can be encrypted, but the encryption parts are not limited to the present embodiment.

Figure 6:
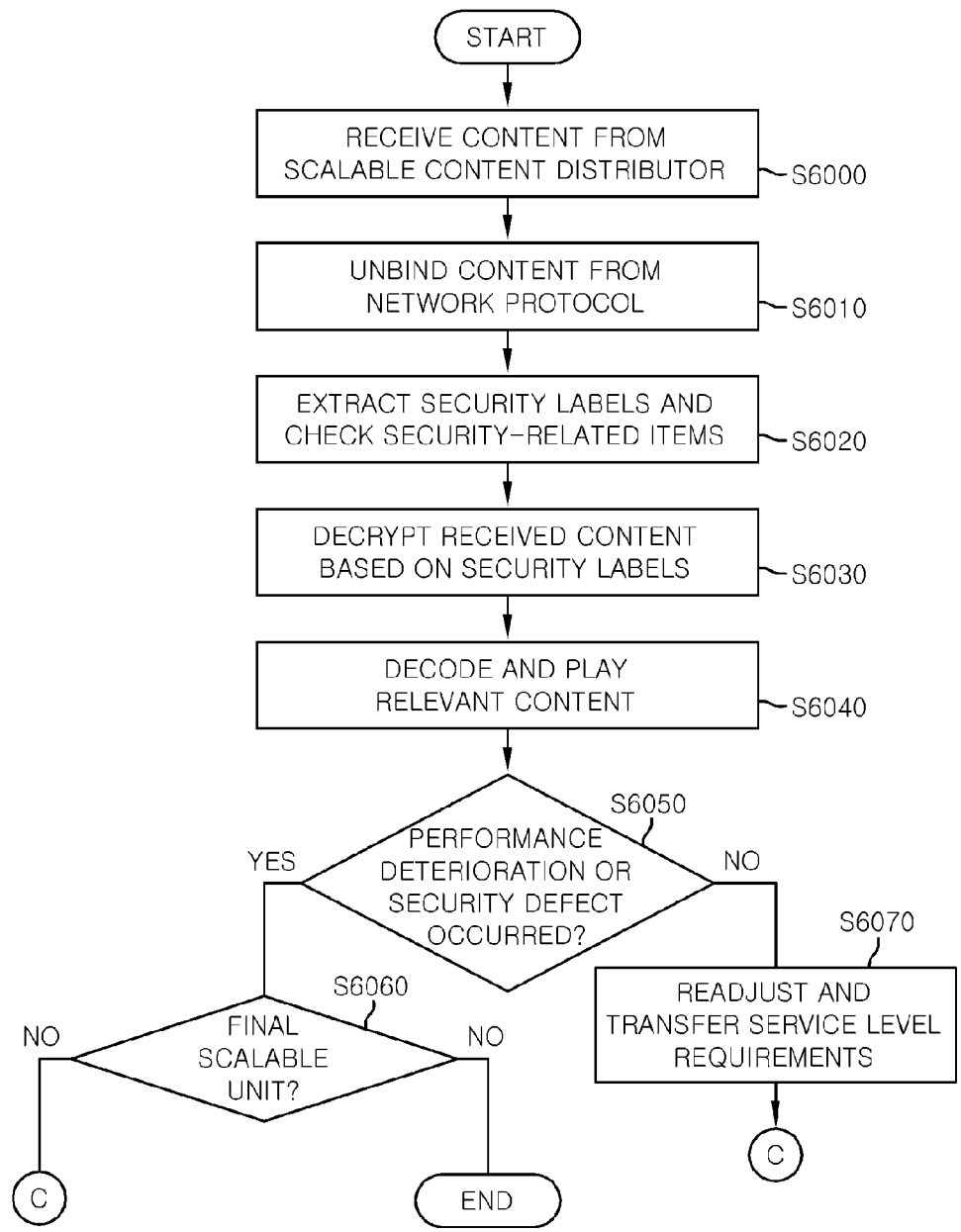
FIG. 6 is a flow chart showing a security label generation method in accordance with the embodiment of the present invention, which shows a process in which a user terminal receives and processes scalable units combined with security labels.

FIG. 6 is a flow chart showing a procedure in which a user terminal receives and processes scalable units combined with security labels.

In step S6000, the scalable content receiver 1200 may receive data in which encrypted scalable content from the scalable content distributor 1160 is combined with security labels.

In step S6010, the scalable content receiver 1200 may unbind the encrypted scalable content and the security labels from a network protocol.

In step S6020, the scalable content receiver 1200 may extract the security labels and check security-related items.

In step S6030, the scalable content receiver 1200 may decrypt the received scalable units on the basis of the extracted security labels.

In step S6040, the scalable content receiver 1200 may decode the decrypted scalable units and play the decoded scalable units.

In step S6050, the scalable content receiver 1200 may determine whether the deterioration of performance or a defect in security has occurred over the course of decryption, decoding or playing.

In step S6060, if it is determined in step S6050 that the deterioration of performance or a defect in security has not occurred (in the case of No), the scalable content receiver 1200 may determine that the current scalable unit is the final scalable unit. If the current scalable unit is the final scalable unit (in the case of Yes), the scalable content receiver 1200 terminates the process, otherwise (in the case of No) it may repeat the procedure starting from step S6000.

In step S6070, if it is determined in step S6050 that the deterioration of performance or a defect in security has occurred, the scalable content receiver 1200 may readjust the values of service level requirements, transfer the readjusted values to the scalable content distributor 1160, and thereafter repeat the above procedure starting from step S6000.

As described above, in accordance with embodiments of the above-described present invention, the optimal security policy determined using six kinds of security-performance evaluation indices may be configured in the form of explicit security labels so as to provide a scalable content distribution service that is more reliable and is excellent in performance.

In detail, the present invention is characterized in that user budget is established on a scalable unit basis, and the cost required to perform each security policy is calculated and compared to the budget, so that even if a security label enabling excellent security and performance to be provided is given, whether such a security label can be realistically provided in terms of cost can be determined. Further, security policies (or security labels) can be uniformly evaluated using three security level evaluation indices and three performance level evaluation indices, so that there is an advantage in that the adaptive QoS that has variety and that more satisfactorily fulfills service requirements, for example, performance-priority policy, security-priority policy or security-performance harmonic policy, can be provided. Furthermore, each security label provides security-related information such as encryption parts, the volumes of the encryption parts, encryption key lengths, encryption algorithms, and hash functions of scalable units, so that differentiated security and performance configuration can be guaranteed for individual scalable units. Therefore, the security label configuration technique in accordance with the present invention measures the excellence of security policies using six kinds of core security-performance evaluation indices, which are configured in terms of encryption parts, the volumes of the encryption parts, encryption key lengths and encryption algorithms, in consideration of information importance of individual scalable units constituting scalable content as well as various users' requirements and network situations. Further, such a technique regards a difference between the user budget and cost required to perform policy as a principal condition. Accordingly, the present invention is advantageous in that it enables the provision of an active technique and apparatus capable of providing an adaptive QoS, which is closer to the requirements of user service levels, is economic in cost, and minimizes security and performance vulnerability, in the form of each security label on a scalable unit basis.

While the invention has been shown and described with respect to the embodiments, it will be understood by those skilled in the art that various changes and modifications may be made without departing from the scope of the invention as defined in the following claims.

What is claimed is:

1. A security label generation apparatus for scalable content distribution, comprising:
   a scalable content transmitter for receiving service level requirements of a user and network bandwidth information over a network and generating security labels and encrypted scalable units, where in the scalable content transmitter includes
   a security-performance level and cost estimator configured to receive a plurality of template security policies, evaluate security-performance levels and costs of the security policies, and select a security policy based on results of evaluation of the costs;
   a scalable content receiver for receiving the encrypted scalable units and the security labels from the scalable content transmitter and for decrypting, decoding, playing, modifying, storing or redistributing the encrypted scalable units based on the security labels; and
   scalable content storage for searching for scalable content and metadata corresponding to a request of the scalable content transmitter.

2. The security label generation apparatus of claim 1, wherein the scalable content transmitter comprises:
   an encoder and extractor for performing functions of transferring a query to the scalable content storage in response to a specific scalable content search request, receiving the scalable content and the metadata from the scalable content storage, encoding the scalable content so as to configure the scalable content in units, dynamically reorganizing a structure of the scalable content in conformity with quality requirements of the user, and executing an encryption task;

a scalable content distributor for receiving a transmission request of the scalable content receiver and the service level requirements, requesting the encoder and extractor to search for scalable content, binding the encrypted scalable units acquired by the encoder and extractor into a network protocol, and transmitting a resulting network protocol to the scalable content receiver;

a network weather monitor for repeatedly measuring a network bandwidth between the scalable content transmitter and the scalable content receiver in the network and transferring the measured network bandwidth;

a Service Level Agreement (SLA) analyzer for receiving the service level requirements and network bandwidth information from the scalable content distributor, receiving information about the network bandwidth from the network weather monitor, and analyzing the requirements in terms of SLA; and an information classifier for receiving the metadata from the scalable content storage and evaluating and classifying the scalable units depending on information importance.

3. The security label generation apparatus of claim 2, wherein the scalable content transmitter further comprises:

an encryptor and key generator for, when a request is received from the scalable content distributor, generating encryption keys having separate key lengths on a scalable unit basis with reference to items of the received security labels, detecting in advance individual encryption algorithms, hash functions, encryption parts, a volume of the encryption parts, or encryption mode, and encrypting a specific region using the generated encryption keys and a prepared encryption algorithm on a scalable unit basis;

a security policy generator for receiving details of the requirements from the information classifier and the SLA analyzer, and generating a plurality of template security policies in conformity with the received requirements; and a security label issuer for receiving the preset security policy from the security-performance level and cost estimator and configuring and issuing security labels together with the scalable content and unit-related data.

4. The security label generation apparatus of claim 3, wherein the scalable content distributor is configured to combine the encrypted scalable units acquired by the encoder and extractor with the security labels acquired by the security label issuer, binding combined data into a network protocol, and transmitting a resulting network protocol to the scalable content receiver.

5. The security label generation apparatus of claim 1, wherein the scalable content receiver is configured to configure the service level requirements for respective items, provide the configured service level requirements together with a specific scalable content transmission request to the scalable content transmitter when making the specific scalable content transmission request, unbind the received data from the network protocol, extract security labels, decrypt, decode, play, modify, store or redistribute the encrypted scalable units based on the security labels, and examine whether a defect in security or deterioration of performance has occurred.

6. The security label generation apparatus of claim 1, wherein the network is an Internet Protocol (IP)-based wired or wireless network, and provides an environment in which the scalable content transmitter can be connected to the scalable content receiver and to the scalable content storage.

7. The security label generation apparatus of claim 1, wherein the scalable content storage stores raw data of content and metadata about the content raw data, and transfers the content raw data and the metadata to the scalable content transmitter.

8. A security label generation method for scalable content distribution, comprising:

when a request for scalable content, together with service level requirements, are received from a scalable content receiver, a scalable content distributor unbinding the service level requirements and scalable content from a network protocol, and classifying and identifying the service level requirements and the scalable content for respective items;

the scalable content distributor requesting scalable content storage to search for the scalable content and metadata, and receiving the scalable content and the metadata;

the scalable content storage transmitting the metadata to an information classifier and evaluating and classifying information importance;

analyzing the user level requirements received from the scalable content distributor, and related security and performance requirements for network bandwidth information received from a network weather monitor;

differently configuring encryption parts, a volume of the encryption parts, encryption algorithms, encryption key lengths, and related security items, for respective scalable units based on the analyzed performance requirements, and then generating a plurality of template security policies;

evaluating the generated template security policies in terms of six kinds of security-performance indices, calculating security-performance levels and costs, and then determining a security policy;

configuring the determined security policy together with the scalable content in a form of security labels, transferring the configured security labels to the scalable content distributor, commanding an encoder and extractor to perform encoding, and applying encryption to the scalable content using a specific method for each relevant scalable unit; and combining encrypted scalable content with the security labels, binding combined results into a protocol of a network, and transmitting a resulting network protocol to the scalable content receiver over the network.

9. The security label generation method of claim 8, further comprising:

the scalable content receiver configuring service level requirements in terms of budget, a scalable content identifier, content quality, device capacity, and redistribution option so as to transfer a scalable content transmission request to the scalable content distributor;

when receiving encrypted scalable units and the security labels from the scalable content distributor, unbinding them from a network protocol, and decrypting, decoding, playing, modifying, storing and redistributing the scalable units depending on items of the security labels;

determining whether a defect in security or deterioration of performance has occurred while combining the scalable units of the received scalable content; and if it is determined that a defect in security or deterioration of performance has occurred, readjusting individual items of the service level requirements of the user to receive the relevant scalable content and transmitting readjusted results of the individual items of the service level requirements to the scalable content distributor.

10. The security label generation method of claim 8, wherein the evaluating and classifying comprises:
   evaluating and classifying the scalable units in terms of information importance for visual reconstruction; and
   evaluating and classifying the scalable units in terms of information importance for business and security.

11. The security label generation method of claim 8, wherein the generating comprises:
   differently setting encryption parts and volumes of the encryption parts for respective scalable units;
   differently setting encryption algorithms for the respective scalable units; and
   differently setting encryption key lengths and related security items for the respective scalable units.

12. The security label generation method of claim 8, further comprising predicting security-performance levels and costs,
   wherein the predicting security-performance levels and costs comprises:
   configuring security indices that include visual distortion, protection strength and redistribution cost, and performance indices that include encryption speed, decoding speed and network overhead;
   calculating weights of the six kinds of security-performance indices based on importance of the scalable units evaluated and classified depending on the security indices and the performance indices;
   depicting weight regions of the six kinds of security-performance indices in forms of radial graphs using the calculated weights;
   predicting cost required when each individual template security policy is performed, and comparing the predicted cost with a budget of the user;
   when the individual template security policy is performed, calculating quantitative values of the six kinds of security-performance indices and depicting the quantitative values inside the weight regions so that the quantitative values overlap the weight regions;
   calculating an area (representing Quality of Service: QoS) of a security-performance execution region of the individual template security policy;
   verifying whether the security-performance execution region of the individual template security policy deviates from the weight region;
   when there occur template security policies for which the cost exceeds the budget or for which the security-performance execution region deviates from the weight region, reissuing new template security policies;
   calculating a difference between the budget and the cost required to perform each individual template security policy as a profit ratio; and
   determining a final security-performance level using the area (QoS) of the individual template security policy and the profit ratio, and determining a template security policy exhibiting a maximum value to be an optimal security policy.

13. The security label generation method of claim 8, further comprising:
   preparing a content resource type, content scalability information, a security-performance level, redistribution permission information, content release/expire date, and crypto-related information so as to configure the security labels;
   differently designating encryption parts, volumes of the encryption parts, encryption algorithms, encryption key lengths, and related security items, in the crypto-related information; and
   differently issuing a security label having a single data format for each scalable unit.

14. The security label generation method of claim 8, wherein the applying the encryption comprises:
   the scalable content distributor individually transferring each security label both to the encoder and extractor and an encryptor and key generator;
   the encryptor and key generator generating an encryption key having a specific length for a relevant scalable unit depending on the received security label, preparing an encryption algorithm, and requesting the encoder and extractor to simultaneously execute encoding and encryption;
   the encoder and extractor encrypting the relevant scalable unit depending on the received security label in cooperation with the encryptor and key generator at a same time that the encoder and extractor encodes the relevant scalable unit depending on the received security label;
   when the encoding and encryption are simultaneously executed and a variation in a structure of the generated scalable content is required, the encoder and extractor extracting a specific scalable unit regardless of whether encryption is executed; and
   transferring encrypted scalable units that have been finally acquired to the scalable content distributor.

15. The security label generation method of claim 8, wherein the transmitting comprises:
   the scalable content distributor receiving the encrypted scalable content and the security labels; and
   combining the encrypted scalable content with the security labels, binding combined results into a network protocol, and transmitting the network protocol.

16. The security label generation apparatus of claim 1, wherein the security label is configured for the selected security policy by optimizing six security-performance evaluation indices.

17. The security label generation method of claim 8, wherein the security labels are configured by optimizing the six kinds of security-performance indices for the determined security policy.

18. The security label generation apparatus of claim 1, wherein the cost of a security policy is compared to a budget of the user for a security policy.

* * * * *